(12) United States Patent
Silver et al.

(10) Patent No.: US 9,771,288 B2
(45) Date of Patent: Sep. 26, 2017

(54) SYSTEM AND METHOD FOR WASTE TREATMENT

(71) Applicant: Cambrian Innovation Inc., Boston, MA (US)

(72) Inventors: Matthew Silver, Cambridge, MA (US); Mark Barosky, Boston, MA (US)

(*) Notice: Subject to any disclaimer, the term of this patent is extended or adjusted under 35 U.S.C. 154(b) by 66 days.

(21) Appl. No.: 14/526,212

(22) Filed: Oct. 28, 2014

(65) Prior Publication Data

US 2015/0114904 A1 Apr. 30, 2015

Related U.S. Application Data

(60) Provisional application No. 61/896,317, filed on Oct. 28, 2013.

(51) Int. Cl.

| | | |
|---|---|---|
| *C02F 3/30* | (2006.01) | |
| *C02F 3/12* | (2006.01) | |
| *C02F 3/08* | (2006.01) | |
| *C02F 3/28* | (2006.01) | |
| *C02F 1/44* | (2006.01) | |
| *C02F 1/00* | (2006.01) | |

(Continued)

(52) U.S. Cl.
CPC ........... *C02F 3/302* (2013.01); *B01D 61/145* (2013.01); *C02F 1/004* (2013.01); *B01D 2325/42* (2013.01); *C02F 1/44* (2013.01); *C02F 3/085* (2013.01); *C02F 3/1273* (2013.01); *C02F 3/286* (2013.01); *C02F 2101/16* (2013.01); *C02F 2203/006* (2013.01); *C02F 2301/046* (2013.01); *C02F 2303/24* (2013.01); *Y02W 10/15* (2015.05)

(58) Field of Classification Search
CPC ........ C02F 3/302; C02F 3/1273; C02F 3/085; C02F 1/004; C02F 2301/046; C02F 2203/006; C02F 3/286; Y02W 10/15
USPC ....... 210/605, 615, 616, 617, 630, 644, 649, 210/150, 151, 252, 259
See application file for complete search history.

(56) References Cited

U.S. PATENT DOCUMENTS

| | | |
|---|---|---|
| 5,656,059 A | 8/1997 | Monster et al. |
| 6,117,313 A | 9/2000 | Goldman et al. |
| 6,444,125 B2 | 9/2002 | Han |

(Continued)

FOREIGN PATENT DOCUMENTS

| | | | |
|---|---|---|---|
| CN | 205398232 U | * | 7/2016 |
| JP | 2006-159112 A | | 6/2006 |
| KR | 20110047615 A | * | 5/2011 |

OTHER PUBLICATIONS

Blaedel, et al., "Mechanism of Trace Counterion Transport Through Ion-exchange Membranes," Anal. Chem., vol. 41 (4), pp. 583-590 (1969).

(Continued)

*Primary Examiner* — Fred Prince
(74) *Attorney, Agent, or Firm* — Capitol Patent & Trademark Law Firm, PLLC

(57) ABSTRACT

Systems and methods for treating multi-component waste streams. In general, systems and methods described herein employ a first chamber and a second chamber separated by a barrier and a filtration component that is fluidically connected to the first and second chambers. A waste stream to be treated will flow into the first chamber for treatment of the carbon-containing waste, then into the filtration component for the separation of the stream into a solid waste fraction and a liquid waste fraction.

25 Claims, 3 Drawing Sheets

(51) Int. Cl.
*B01D 61/14* (2006.01)
*C02F 101/16* (2006.01)

(56) References Cited

U.S. PATENT DOCUMENTS

| | | | |
|---|---|---|---|
| 7,959,780 | B2 | 6/2011 | Hawkins et al. |
| 2003/0057162 | A1 | 3/2003 | Goulao Crespo et al. |
| 2003/0209489 | A1 | 11/2003 | Haerther et al. |
| 2004/0149634 | A1 | 8/2004 | Hughes |
| 2004/0159608 | A1 | 8/2004 | Hoffland |
| 2006/0037896 | A1 | 2/2006 | Cote et al. |
| 2006/0207925 | A1 | 9/2006 | Levy |
| 2008/0277272 | A1 | 11/2008 | Pierce et al. |
| 2009/0250394 | A1 | 10/2009 | Taylor |
| 2011/0236724 | A1 | 9/2011 | Mayer et al. |
| 2012/0006744 | A1* | 1/2012 | Phattaranawik ........ C02F 3/301 210/605 |
| 2013/0017414 | A1 | 1/2013 | He |
| 2013/0075279 | A1 | 3/2013 | Buck et al. |
| 2013/0112601 | A1 | 5/2013 | Silver et al. |

OTHER PUBLICATIONS

International Search Report and Written Opinion issued by the Korean Intellectual Property Office as International Searching Authority for International Application No. PCT/US2013/054163 mailed Nov. 14, 2013 (12 pgs.).

International Search Report and Written Opinion issued by the U.S. Patent and Trademark Office as International Searching Authority for International Application No. PCT/US2014/62646 mailed Mar. 26, 2015 (12 pgs.).

Van Rijn, J., "The Potential for Integrated Biological Treatment Systems in Recirculating Fish Culture—A Review," Aquaculture, vol. 139, pp. 181-201 (1996).

Kim, et al., "A Microbial Fuel Cell Type Lactate Biosensor Using a Metal-Reducing Bacterium, Shewanella putrefaciens", J. Microbial. Biotechnol., 1999, 9(3), pp. 365-367.

Notice of Reasons for Rejection having a mail date of Nov. 1, 2006 for Japanese Patent Application No. 2016-005028 consisting of 4 pages.

Examination Report having a mail date of Nov. 1, 2016 for Canadian Patent Application No. 2,783,256 consisting of 4 pages.

* cited by examiner

SYSTEM AND METHOD FOR WASTE TREATMENT

CROSS REFERENCE TO RELATED APPLICATION

The present application claims the benefit of U.S. Provisional Patent Application No. 61/896,317, filed Oct. 28, 2013, the contents of which are hereby incorporated by reference.

FIELD OF THE INVENTION

The present application generally relates to treating multi-component waste streams.

BACKGROUND

Aquaculture—the farming of aquatic organisms—is a fast-growing venture that fills a gap between a diminishing supply of wild fish and world demand for seafood. As aquaculture expands globally and environmental regulations become more strict, the reuse of water is necessary both to meet regulation and to sustain production. However, aquaculture wastewater must be treated to be reused. Additionally, aquaculture sites are typically close to areas where discharge to surface waterways or municipal systems is the only option. See, generally, *The State of World Fisheries and Aquaculture*, by the Food and Agricultural Organization of the United Nations (FAO) Fisheries and Aquaculture Department, Rome, Italy, 2012 (209 pages).

Anaerobic digestion is one means by which municipalities treat waste water to reduce organic carbon and solids in volume and mass. Anaerobic digestion has been used to treat agricultural waste with varying rates of success. Anaerobic digestion of agricultural waste, and particularly of aquacultural wastewater, is difficult due to ammonia inhibition and solids concentration. While solids are commonly treated by dilution, this creates a very large volume of waste. Also, the physical removal of ammonia has not always proven satisfactory.

SUMMARY

The present application generally relates to systems and methods for treating multi-component waste streams that involve separating components of waste streams for separate treatment. In accordance with certain aspects, the methods and systems described herein provide for the economical reduction of ammonia concentrations to further the development of a stable, cost-effective anaerobic digester potentially benefitting multiple industries and enabling the combined reduction or removal of total solids (TS), chemical oxygen demand (COD), and nitrogen. Systems and methods described herein may find particular applicability in treating aquacultural wastewater.

In accordance with one aspect, the systems and methods employ a first chamber and a second chamber separated by a barrier, and a filtration component that is fluidically connected to the first and second chambers. A waste stream to be treated will flow into the first chamber for treatment of carbon-containing waste, then into the filtration component for the separation of the stream into a substantially solid waste fraction and a substantially liquid waste fraction. The liquid waste fraction will then flow into the second chamber for further treatment. In particular embodiments, the first chamber is fluidically coupled to an aquacultural wastewater source and the waste stream includes aquacultural wastewater.

In certain aspects, the present application provides a system for treatment of a waste stream. The system includes a first chamber to receive a waste stream comprising at least a first substance and a second substance, a second chamber, and a semipermeable barrier disposed between the first chamber and the second chamber allowing at least the first substance to pass between the first and second chamber while prohibiting the second substance. The system may also include a mechanical filter for separating materials suitable for treatment in the first chamber but not the second chamber from material to be treated in the second chamber. The mechanical filter typically separates solid materials from the waste stream.

In some embodiments, the first chamber is an anaerobic digestion chamber and the second chamber may be an aerobic nitrification reactor. In certain embodiments, the semipermeable barrier is an ion-exchange membrane (e.g., an anion exchange membrane).

Related aspects of the invention provide a system for the combined treatment of a waste stream, wherein two or more substances are treated in substantially different treatment environments. The system includes a first chamber (e.g., for anaerobic digestion) and a second chamber (e.g., for aerobic nitrification) with a semipermeable barrier disposed between the first chamber and the second chamber allowing at least one of the two or more substances to pass between the first and second chamber while prohibiting others. A filtration component capable of separating materials suitable for treatment in the first chamber but not the second chamber from material to be treated in the second chamber may be included.

In some aspects, the filtration component separates solid materials from the waste stream. In some embodiments, the semipermeable barrier is an ion-exchange membrane such as an anion exchange membrane.

Also described herein are methods for treating a waste stream by flowing a stream of waste into a first chamber, flowing at least some of the waste into a filtration component, separating a solid waste fraction from a liquid waste fraction within the waste using the filtration component, and flowing the liquid waste fraction into a second chamber for treatment. In some embodiments, the filtration component comprises a mechanical filter and the separating comprises mechanically filtering the waste. In accordance with one embodiment, the first chamber comprises an anaerobic digestion chamber. In certain embodiments, the second chamber comprises an aerobic nitrification membrane bioreactor, which may include a moving bed membrane bioreactor.

In some embodiments, the moving bed membrane bioreactor includes a suspended media as a structure for the growth of a biofilm and a semi-permeable membrane barrier that allows some compounds to pass and exit the moving bed membrane bioreactor.

DETAILED DESCRIPTION

Figure 1:
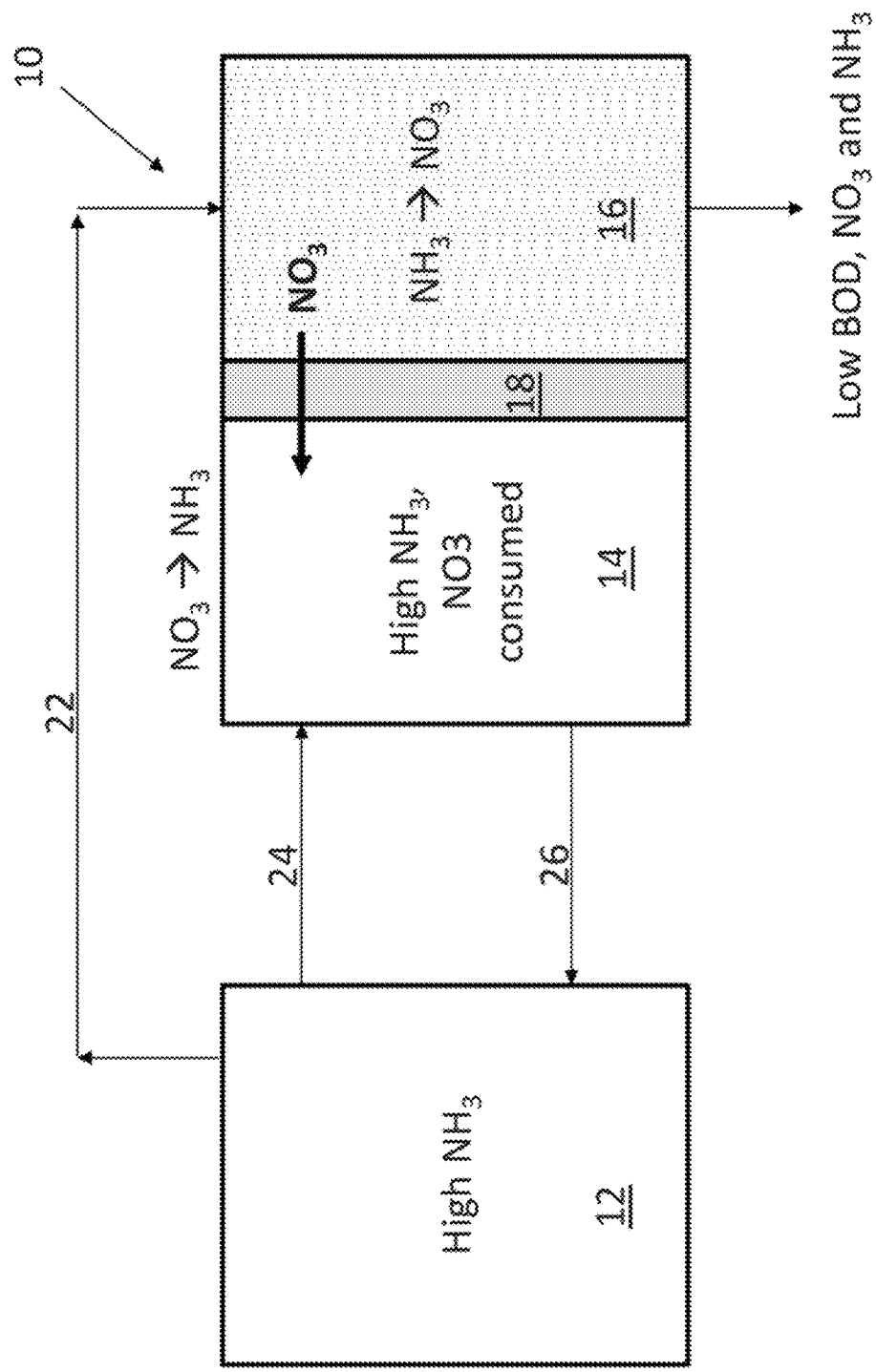
FIG. 1 provides a general process description in accordance with one aspect of the present invention.

The present application relates to systems and methods for treating wastewater. In accordance with certain embodiments, the present application provides methods and systems for the economical reduction of ammonia concentrations to further the development of a more stable, cost-effective anaerobic digester and enabling the combined reduction or removal of total solids (TS), chemical oxygen demand (COD), and nitrogen. Systems and methods described herein may find particular applicability in treating aquacultural wastewater.

Definitions

The term "conduit" or any variation thereof, as used herein, includes any structure through which a fluid may be conveyed. Non-limiting examples of conduit include pipes, tubing, channels, or other enclosed structures.

The term "chamber" or any variation thereof, as used herein, includes any body structure capable of retaining fluid. Non-limiting examples of chambers include vats, kettles, tubs, reactors or other similar structures.

The term "about" or "approximately," as used herein, are defined as being close to as understood by one of ordinary skill in the art, and in one non-limiting embodiment the terms are defined to be within 10%, more particularly within 5%, still more particularly within 1%, and is some cases within 0.5%.

The terms "inhibiting" or "reducing" or any variation of these terms, as used herein, includes any measurable decrease or complete inhibition to achieve a desired result.

The use of the word "a" or "an" when used in conjunction with the term "comprising" herein may mean "one," but it is also consistent with the meaning of "one or more," "at least one," and "one or more than one."

The term "or" as used herein, means "and/or" unless explicitly indicated to refer to alternatives only or the alternatives are mutually exclusive, although the disclosure supports a definition that refers to only alternatives and "and/or."

The term "filtrate" or "permeate" as used herein may refer to material that has passed through a separation device, including, but not limited to a filter or membrane.

The term "retentate" as used herein may refer to material that remains after the diffusate has passed through a separation device.

As used herein, the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The term "solid phase" as used herein refers to a collection of material that is generally more solid than not, and is not intended to mean that all of the material in the phase is solid. Thus, a phase having a substantial amount of solids, while retaining some liquids, is encompassed within the meaning of that term. Meanwhile, the term "liquid phase," as used herein, refers to a collection of material that is generally more liquid than not, and such collection may include solid materials and gaseous materials.

The term "wastewater" as used herein refers to water to be treated, such as streams or bodies of water from residential, commercial, municipal, industrial or agricultural sources as well as mixtures thereof, which typically contain a variety of contaminants or pollutants.

The term "end-of-pipe (EOP) wastewater" as used herein refers to raw wastewater from an upstream industrial, domestic, or other wastewater producing process.

The term "waste stream" as used herein refers to a flow or source of wastewater.

The term "treated wastewater" refers to wastewater that has been processed in some manner to provide a composition containing less undesirable species or pollutants relative to a starting composition.

The term "substantially" as used herein shall mean mostly.

In one embodiment, the first chamber comprises an anaerobic digestion (AD) chamber and the second chamber comprises an aerobic nitrification membrane bioreactor. The nitrification membrane bioreactor may be a moving bed bioreactor or a suspended growth bioreactor. One example of a particularly useful moving bed is a moving bed membrane bioreactor (MBMBR). An MBMBR, an improvement upon the traditional moving bed bioreactor (MBBR), utilizes a suspended media as a structure to support and facilitate growth of a biofilm and includes a semi-permeable barrier that allows some compounds to pass and exit the MBMBR while retaining those compounds to be treated by the MBMBR. However, it should be noted that any aerobic nitrification reactor can be used in the second chamber, such as a suspended growth nitrification bioreactor.

To improve the stability of AD reactor operation, the reaction-limiting ammonia must first be removed from the digestate and converted to nitrate. The transport of nitrate back into the digestate may be directly facilitated by implementing an aerobic nitrification membrane bioreactor with an ion exchange membrane as a membrane barrier. Containing the nitrification bioreactor in the ion exchange membrane and then placing the reactor directly next the AD digestate, nitrate would be directly transported into the digestate. This design would then facilitate the in situ denitrification rather than requiring completely separate reactor vessels.

FIG. 1 is a schematic overview of the general process 10 in accordance with certain aspects of the present invention and depicts an anaerobic digestion system 12, 14 and an aerobic nitrification reactor 16. A semi-permeable membrane 18 is disposed between AD 14 and aerobic nitrification reactor 16. The wastewater source feeds AD 12, the contents of which are typically characterized by high levels of $NH_3$. Wastewater portions from the AD 12 can be directed to the AD 14 or the aerobic nitrification reactor 16 through conduits 22 and 24, respectively. Digestate from AD 14 can be conveyed back to AD 12 through conduit 26. Typically, wastewater is directed to AD 12, wherein the organic waste is reduced. The typical total solids (TS) concentration in the AD is approximately between 0.5 and 6%. In accordance with certain aspects the TS concentration is approximately between 0.5-2.0%, or in some cases, 2.0-4.0%, and in yet other cases, 4.0-6.0%. The anaerobic digestate is conveyed to aerobic nitrification reactor 16 through conduit 22 where nitrification results in the conversion of total ammoniacal nitrogen (TAN) to $NO_3$—N. The semi-permeable membrane 18 enables transport of negatively charged ions to pass freely from aerobic nitrification reactor 16 to AD 14 to facilitate final nitrogen removal via denitrification. The removal of nitrogen will be carried out by heterotrophic bacteria in the AD in which the bacteria use the solubilized COD as a carbon source and the nitrates as electron acceptors to finally produce nitrogen gas. The system effluent after the nitrification membrane unit will ideally contain reduced amounts of nitrogen, biological oxygen demand, and suspended solids. These amounts are reduced with respect to conventional systems. The actual amounts will vary depending on the composition of the incoming wastewater stream.

Figure 2:
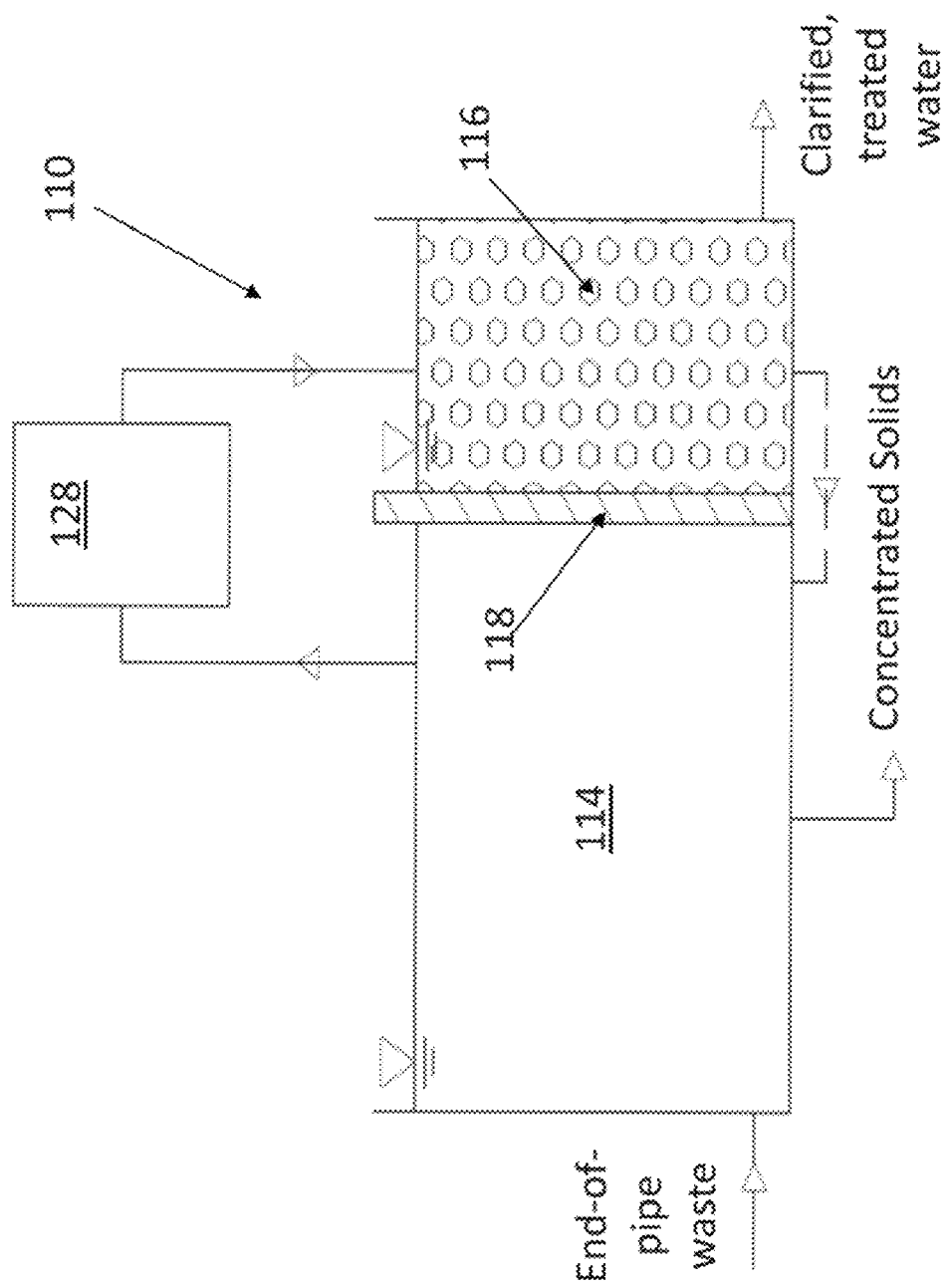
FIG. 2 illustrates one embodiment of the present invention relating to a packaged configuration of the components.

FIG. 2 is a schematic diagram showing a packaged configuration 110 in accordance with certain aspects of the present invention. As shown, the configuration depicts an anaerobic digestion chamber (AD) 114 and an aerobic nitrification reactor 116. A semi-permeable membrane 118 is disposed between AD 114 and aerobic nitrification reactor 116. End-of-pipe (EOP) waste from a wastewater source feeds AD 114, wherein the organic waste solids are reduced. The anaerobic digestate can be conveyed to a mechanical filter 128 to remove excess biomass and then the diffusate can be introduced to aerobic nitrification reactor 116 where nitrification results in the conversion of total ammoniacal nitrogen (TAN) to $NO_3$—N. The semi-permeable membrane 118 enables transport of negatively charged ions to pass freely from aerobic nitrification reactor 116 to AD 114 to facilitate final nitrogen removal via denitrification. The removal of nitrogen can be carried out by heterotrophic bacteria in the AD 114 in which the bacteria use the solubilized COD as a carbon source and the nitrates as electron acceptors to finally produce nitrogen gas. In accordance with certain aspects, the system effluent after the nitrification membrane unit will contain reduced amounts of nitrogen, biological oxygen demand, and solids. Recycling of the stream through the AD process may be enabled in the case of required additional nitrogen removal. The residual solids in the AD 114 can be concentrated via settling and can be removed from the system.

Figure 3:
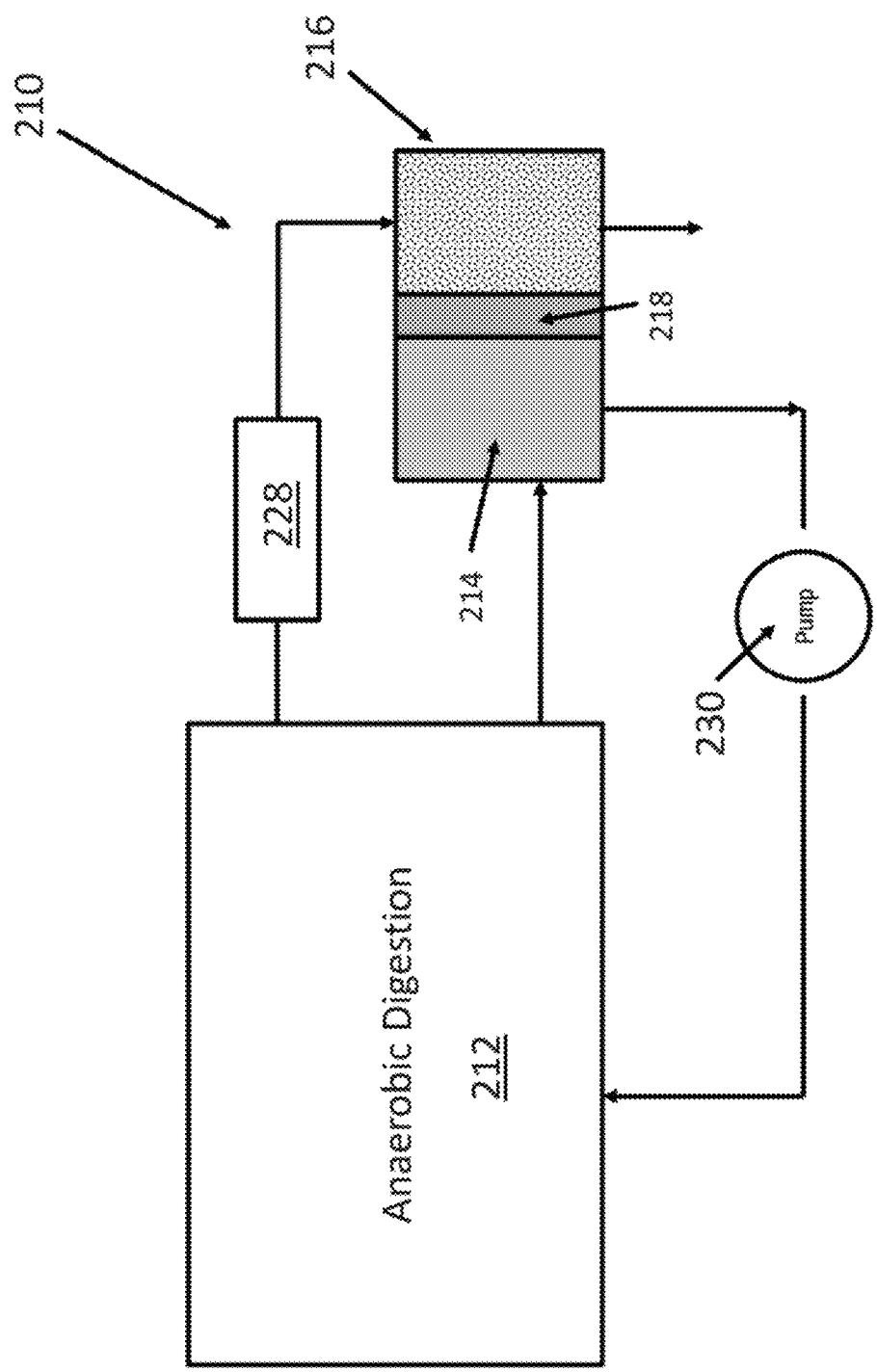
FIG. 3 illustrates another embodiment of the present invention relating to a side-stream configuration of the components.

FIG. 3 is a schematic diagram of a side-stream configuration 210 in accordance with certain aspects of the present invention. The configuration 210 includes an anaerobic digestion system 212, 214 and an aerobic nitrification reactor 216. A semi-permeable membrane 218 is disposed between AD 214 and aerobic nitrification reactor 216. The wastewater source feeds anaerobic chamber 212, where organic waste is reduced. The anaerobic digestate can be conveyed to a mechanical filter 228 to further remove excess biomass and then the diffusate can be introduced to aerobic nitrification reactor 216 where nitrification results in the conversion of total ammoniacal nitrogen (TAN) to $NO_3$—N. The semi-permeable membrane 218 enables transport of ions to pass freely from aerobic nitrification reactor 216 to AD 214 to facilitate final nitrogen removal via denitrification. The removal of nitrogen can be carried out by heterotrophic bacteria in the AD in combination with the solubilized COD to finally produce nitrogen gas. Recycling of the stream by using pump 230 to convey flow from AD 214 to AD 216 may be enabled in the case of required additional nitrogen removal. The system effluent after the nitrification membrane unit will ideally contain reduced amounts of nitrogen, biological oxygen demand, and solids.

In accordance with certain embodiments, the semi-permeable membrane barrier 18, 118, 218 is an ion-exchange membrane and, in some cases, an anion exchange membrane. Understanding the relative abundance of the ionic constituents in the effluent stream will enable an appropriate sizing of the membrane bioreactor unit process. In order for ion transport across the membrane to occur, two conditions must be met: a concentration gradient must exist for both the ion and counter-ion between the two membrane sides, and an electrical charge equivalency must counter the charge movement across the membrane. In other words, if a negatively charged monovalent ion is transported across the membrane from cathode to anode, an equivalent monovalent counter-ion must also move across the membrane in the opposite direction to re-establish electroneutrality between the compartments. In accordance with certain aspects, the underlying goal is to create a favorable nitrate concentration gradient between the membrane unit and the anaerobic digester, in which the nitrate transport is facilitated by a benign counter-ion transfer from the AD to the membrane unit.

In accordance with some embodiments, the aerobic nitrification reactor 16, 116, 216 comprises a moving bed reactor or a suspended growth bioreactor. The moving bed reactor may be a moving bed membrane bioreactor (MBMBR) or a traditional moving bed bioreactor (MBBR). For use in the combined treatment of organic waste (e.g., COD & BOD) and nitrogenous waste, the barrier will allow the passage of nitrates and nitrites, while prohibiting the passage of ammonia. This will allow the nitrates to pass through to the first chamber for microbial denitrification while retaining substances for nitrification in the MBMBR and preventing the aerobic conditions in the second chamber from interfering with the anaerobic character of the first chamber. This allows the system to address significant limitations of anaerobic systems in the treatment of waste with a significant nitrogenous waste components; the generation of ammonia which inhibits further digestion and limits total solids concentrations in the digester. This will, among other benefits, allow for higher concentrations of solids to be treated and allow for smaller treatment systems to provide comparable solids treatment capacity to conventional AD systems. Denitrification is discussed in U.S. Pub. 2013/0112601 to Silver, et al., the contents of which are incorporated by reference for all purposes. See also U.S. Pub. 2012/0132521 to Silver et al., the contents of which are incorporated by reference.

The mechanical filtration component 128, 228 may have a purely mechanical function, such as a Zabel filter or hollow fiber ultrafiltration membrane, or it may be a separate biological treatment unit such as an upflow fixed bed bioreactor (UFBBR), or an upflow anaerobic sludge blanket (UASB) reactor. It should be noted that any component or mechanism which functions to separate solids from first chamber's stream is suitable for use in methods and systems disclosed herein.

The reactor system may be sized relative to the respective concentrations of total suspended solids (TSS), chemical oxygen demand (COD), and nitrogen in the EOP stream and the expected treatment rates to maintain an ammonia concentration<200 mg/L, the generally accepted upper concentration limit. The combined anaerobic digestion and aerobic nitrification reactor system may be sized according to relevant reaction rates obtained from literature or prior in-house studies. Relative compartment sizing will be largely dependent on the reaction rates and the ion flux through the membrane as described by Blaedel et al. (1969) in Equation 1:

$$J_i = \frac{C_{i,1}/C_{a,1}^z - C_{i,2}/C_{a,2}^z}{L/(P_{i,m} \times (Q/a)^z) + \delta_1/(D_{i,w} \times C_{a,1}^z) + \delta_2/(D_{i,w} \times C_{a,2}^z)} \quad (1)$$

where, $C_{i,1}$ and $C_{i,2}$ are the concentrations of the polluting ion i in the MBMBR and the AD compartment, respectively, noted as 1 and 2; $C_{a,1}$ and $C_{a,2}$ are the major bulk counter-ion concentrations in each compartment (e.g., bicarbonate); a represents the valence of the major counter-ion; z represents the ratio between the valence of the target ion (i) (e.g., nitrate) and the valence of the major counter-ion; $\delta 1$, $\delta 2$ are the thickness of the corresponding boundary layers next to the membrane surfaces at the MBMBR and AD sides, respectively; L is the membrane thickness; $P_{i,m}$ is the membrane permeability; Q is the ion exchange capacity of the membrane and $D_{i,w}$ is the diffusion coefficient of the counter-ion in water. Here, Equation 1 shows that the nitrate flux from the MBMBR into the AD is proportional to the difference between the ratio(s) of the target counter-ion to the major counter-ion concentration in the two compartments. This difference is the process driving force.

The waste stream entering the anaerobic digester (AD) contains high amounts of COD, TSS, nitrogen (organic and inorganic), and phosphorous-containing compounds. Because the soluble COD (sCOD) in the EOP is not sufficient alone to enable the complete removal of nitrogen, digestion of the particulate fraction of the EOP is required to extract and solubilize the COD present in particulate form (van Rijn, 1995). However, the presence of $NO_3$—N will preferentially select for heterotrophic denitrification (anaerobic respiration) processes and possibly outcompete the fermentative anaerobobes in substrate utilization, thus potentially reducing VFA extraction processes. As such, the reactor system should be designed based on the balance whereby the VFA production process, the nitrate transport process from the MBMBR into the AD, and the subsequent denitrification process will all be combined and optimized. Solubilizing the COD initially present only in the particulate matter will make the COD available for denitrification; however, the goal is to prevent further reduction to biogas end products such as carbon dioxide and potentially methane and/or hydrogen by balancing the rate of COD solubilization and the nitrate delivery rate into the digestate.

The MBMBR typically use plastic bio-media to support the growth of the nitrifying bacteria. The amount of media and hydraulic retention time will be based on the required ammonia conversion. Similarly, the amount of nitrate production will also contribute to the sizing of the membrane wall separating the two units in order to remove maximal amounts of nitrate as transport of the nitrate into the AD process will be mitigated by the amount of membrane surface area. Suitable media for the biomass carrier may be made from hydrophobic polymers such as polyethylene or polypropylene which are processed to create a highly protected external or internal surface area for biofilm attachment and accumulation of high biomass concentrations. Several commercial organizations supply such media primarily as extruded cylindrical media. Suitable media is commercially available from a number of companies including Evolution Aqua Ltd., Siemens/Aqwise and Hydroxyl. In certain embodiments, the biofilm carrier may occupy about 20% to 75% of the volume of the chamber.

The MBMBR and AD reactors can be placed in the same tank separated only by the ion exchange membrane. The two reactor volumes will be hydraulically equalized to establish equal pressure on both sides of the membrane.

Although certain embodiments are particularly suited to the combined treatment of COD and nitrogenous waste, similar configurations would allow for the treatment of other ionic compounds. Because the semi-permeable barrier can be selected to prohibit the transfer of chemical compounds and biology from chamber to chamber, substantially different treatment environments can be created.

The anaerobic digestion process itself will ultimately reduce chemical oxygen demand (COD) and total solids (TS), but the optimal reduction rate will depend on a multitude of factors including (but not limited to): pH, temperature, alkalinity, solids feed rate, digester solids concentration, hydraulic residence time (HRT), solids retention time (SRT), and internal recirculation rates.

The goal for the nitrification process is required to convert the ammonia produced during the anaerobic digestion processes to nitrate. Subsequently, the nitrate produced in the aerobic nitrification reactor is transported across the membrane to the AD as efficiently as possible. The nitrification performance will be characterized as a function of the volumetric flow rate, the difference between the influent and effluent TAN concentrations, and the media volume in the aerobic nitrification reactor (volumetric TAN removal rate; VTR). Quantification of the nitrate transport rates can be determined as a function of the influent and effluent total nitrogen loading rates (nitrate mass flow in and out of the aerobic nitrification reactor) to verify nitrogen is indeed being removed from the system rather than being converted to a different form.

The architecture of systems 10, 110, 210 can be configured in any way such that there are two chambers separated from each other by the semipermeable membrane. For example, the first chamber and second chamber could be formed by two separate tanks disposed on either side of the barrier as in FIG. 3. Alternatively, the second chamber could be a self-contained unit with at least a portion of its structure composed of the barrier (such as a cylinder with membrane materials for walls), which can be inserted or placed within an existing anaerobic digestion unit.

The present application also relates to methods of utilizing the systems described herein. In accordance with one aspect, the method comprises flowing a stream of waste into a first chamber, flowing at least some of the waste into a filtration component, separating a substantially solid waste fraction from a substantially liquid waste fraction within the waste using the filtration component, and flowing the liquid waste fraction into a second chamber for treatment. In some embodiments, the filtration component comprises a mechanical filter and the separating comprises mechanically filtering the waste. In accordance with one aspect, the first chamber comprises an anaerobic digestion chamber. In certain embodiments, the second chamber comprises an aerobic nitrification membrane bioreactor, which may include a moving bed membrane bioreactor.

In some embodiments, the moving bed membrane bioreactor includes a suspended media as a structure for the growth of a biofilm and a semi-permeable membrane barrier that allows some compounds to pass and exit the moving bed membrane bioreactor.

Water quality is further discussed in U.S. Pub. 2013/0075279 to Buck and Silver, the contents of which are incorporated by reference for all purposes.

It is to be understood that the invention has been described in conjunction with particularly useful specific embodiments thereof and that the foregoing description is intended to illustrate and not limit the scope of the invention. Other aspects, advantages and modifications within the scope of the invention will be apparent to those skilled in the art to which the invention pertains.

What is claimed is:

1. A system for treatment of a waste stream, the system comprising:
   a first chamber to receive a waste stream comprising at least a first substance and a second substance;

a second chamber;
an ion-exchange membrane disposed between the first chamber and the second chamber allowing at least the first substance to pass between the first and second chamber while prohibiting passage of the second substance; and
a mechanical filter fluidically connected between the first chamber and the second chamber for separating materials suitable for treatment in the first chamber but not the second chamber from material to be treated in the second chamber.

2. The system of claim 1, wherein the first chamber is an anaerobic digestion chamber.

3. The system of claim 1, wherein the second chamber is an aerobic nitrification reactor.

4. The system of claim 1, wherein the mechanical filter separates solid materials from the waste stream.

5. The system of claim 1, wherein the ion-exchange membrane is an anion exchange membrane.

6. The system of claim 1, wherein the waste water is aquacultural waste water.

7. A system for the combined treatment of a waste stream, wherein two or more substances are treated in substantially different treatment environments, comprising:
a first chamber and a second chamber;
an ion-exchange membrane disposed between the first chamber and the second chamber allowing at least one of the two or more substances to pass between the first and second chamber while prohibiting others; and
a filtration component capable of separating materials suitable for treatment in the first chamber but not the second chamber from material to be treated in the second chamber.

8. The system of claim 7, wherein the first chamber is an anaerobic digestion chamber.

9. The system of claim 7, wherein the second chamber is an aerobic nitrification reactor.

10. The system of claim 7, wherein the filtration component comprises a biological treatment unit.

11. The system of claim 7, wherein the ion-exchange membrane is an anion exchange membrane.

12. The system of claim 7, wherein the waste water is aquacultural waste water.

13. A method for treating a waste stream, the method comprising:
flowing a stream of waste into a first chamber;
flowing at least some of the waste into a filtration component;
separating a solid waste fraction from a liquid waste fraction within the waste using the filtration component; and
flowing the liquid waste fraction into a second chamber for treatment, wherein an ion exchange membrane is disposed between the second chamber and a third chamber, the ion exchange membrane allowing for ion transport between the second and third chambers across the membrane.

14. The method of claim 13, wherein the filtration component comprises a mechanical filter and the separating comprises mechanically filtering the waste.

15. The method of claim 13, wherein the first chamber comprises an anaerobic digestion chamber.

16. The method of claim 13, wherein the second chamber comprises an aerobic nitrification membrane bioreactor.

17. The method of claim 16, wherein the aerobic nitrification membrane bioreactor comprises a moving bed membrane bioreactor.

18. The method of claim 17, wherein the moving bed membrane bioreactor comprises:
a suspended media as a structure for the growth of a biofilm; and
a semi-permeable membrane barrier that allows some compounds to pass and exit the moving bed membrane bioreactor.

19. The method of claim 13, wherein the waste water is aquacultural waste water.

20. A system for treatment of an aquaculture waste stream, the system comprising:
an anaerobic digestion chamber to receive an aquaculture waste stream comprising at least a first substance and a second substance;
an aerobic nitrification reactor; and
an ion-exchange membrane disposed between the anaerobic digestion chamber and the aerobic nitrification reactor allowing at least the first substance to pass between the first and second chamber while prohibiting the second substance.

21. The system of claim 20, further comprising a mechanical filter fluidically connected to the anaerobic digestion chamber and the aerobic nitrification reactor.

22. The system of claim 21, wherein the mechanical filter separates solid materials from the waste stream.

23. The system of claim 20, wherein the ion-exchange membrane is an anion exchange membrane.

24. The system of claim 20, wherein the aerobic nitrification membrane bioreactor comprises a moving bed membrane bioreactor.

25. The system of claim 24, wherein the moving bed membrane bioreactor comprises:
a suspended media as a structure for the growth of a biofilm; and
a semi-permeable membrane barrier that allows some compounds to pass and exit the moving bed membrane bioreactor.

* * * * *